May 8, 1928.  1,668,950

T. DANTZIG

COMPUTING SCALE

Original Filed Nov. 15, 1919  2 Sheets-Sheet 1

Inventor
Tobias Dantzig
By his Attorneys
Kerr, Page, Cooper & Hayward

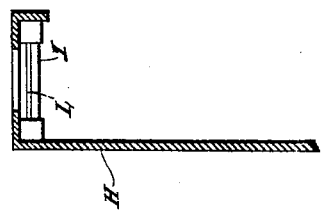
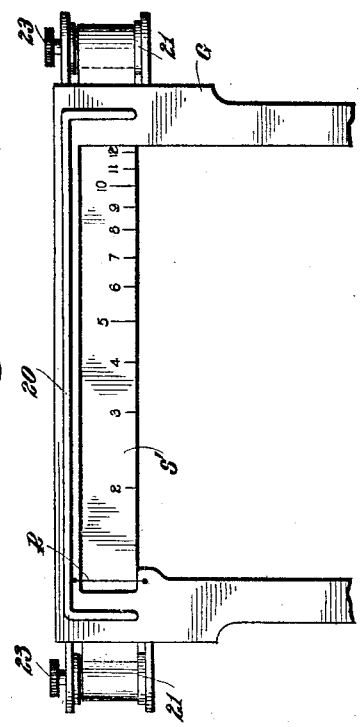
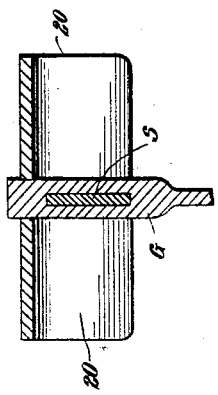
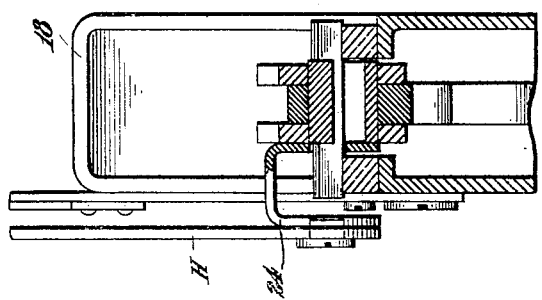

Patented May 8, 1928.

1,668,950

UNITED STATES PATENT OFFICE.

TOBIAS DANTZIG, OF NEW YORK, N. Y., ASSIGNOR TO THE COMPUTING-TABULATING-RECORDING COMPANY, OF NEW YORK, N. Y., A CORPORATION OF NEW YORK.

COMPUTING SCALE.

Application filed November 15, 1919, Serial No. 338,255. Renewed August 19, 1925.

This invention relates to computing scales. More specifically it relates to a system whereby when a manual setting of an element in accordance with the price per unit weight of a commodity is made a direct reading of total price of the commodity may be obtained.

One of the principal objects of the present invention is to provide a computing scale of the type referred to in which simplicity of structure, which is conducive to low-cost production, is attained without sacrificing the necessary accuracy of instruments of this class.

Fig. 2 is a detail section taken on the line 2—2 of Fig. 1.

Fig. 3 is a detail section on the line 3—3 of Fig. 1.

Fig. 4 is a detail side elevation partly in section of the arm H shown in Fig. 1.

Fig. 5 is a detail elevation illustrating a modified form of slide.

Figure 1:
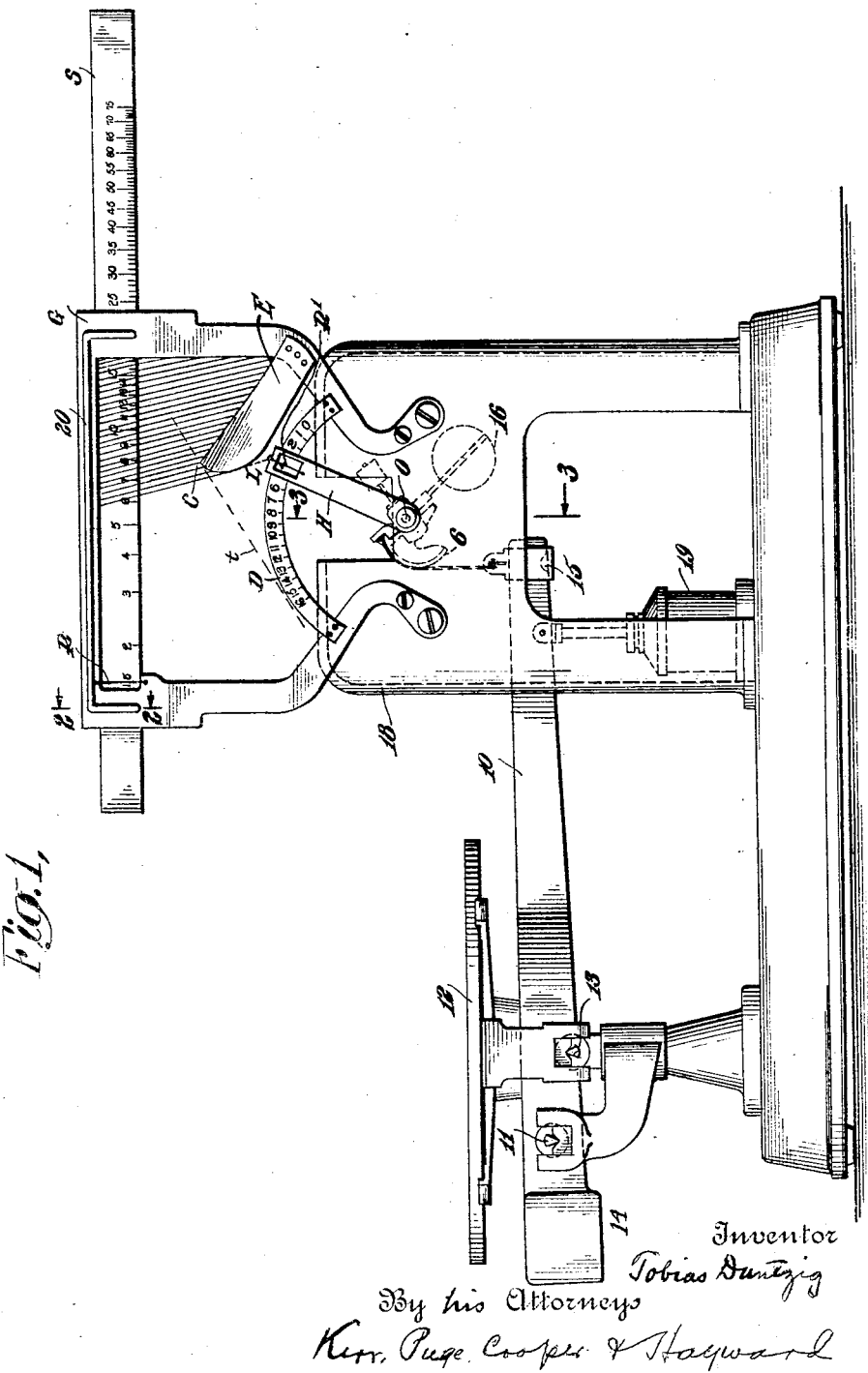
Figure 1 is an elevation of one form of scales embodying my invention.

In carrying out my invention I utilize the well known slide rule principle of obtaining the product of two factors by obtaining the antilog of the sum of the logarithms of the individual factors. Thus in Fig. 1 I have illustrated a slide S having thereon a logarithmic scale. This slide is adapted to cooperate with a relatively fixed reference mark or line R. Let it be assumed that the slide S is set to the price per pound of the particular commodity under consideration, for example the slide is shown in Fig. 1, set to a price of 1.5 cents per pound. If a point is now selected, on the scale, which is spaced from the reference line R a distance proportional to the logarithm of the weight of that commodity (employing the same scale of distance as that used in laying out slide S) the reading on slide S at that point will indicate the antilog of the sum of the log of price per pound plus the log of the total weight. In other words, the total price of the commodity in question will be indicated.

The slide S may readily be set by hand, with reference to the index R, to the particular price per pound or other unit weight. The other setting however is accomplished automatically; i. e., means are provided for automatically and distinctively disclosing that part of the slide scale which is spaced from the index R a distance proportional to the log of the weight of the commodity. This means comprises a part actuated by the weight of the commodity and deflected to an extent directly proportional to such weight. To effect the distinctive disclosure, above mentioned, by movement of said part without imposing a sensitivity-destroying load on said part and consequently on the scales, I prefer to employ means of the type illustrated which may be constructed substantially as follows.

The weight actuated part shown in the form of an arm H pivoted at O is provided with a line source of light such as an incandescent electric lamp 1, provided with a straight filament L which extends preferably in a direction parallel to the axis O. Current may be conducted to the lamp by any suitable means, not shown, such for example as slip ring connections at the axis O, or flexible leads. Between the source L and the slide S is interposed a screen E to cast a shadow on said slide. This screen E may be secured to the yoke G which slidably supports the scale S and which is secured to the weighing scale structure as will hereinafter appear. By properly designing said screen the line of separation of the shadow and light portions of the scale S may be utilized to disclose distinctively that portion of the scale S which is spaced from the index R an amount proportional to the log of the weight. In other words, I provide a weight-responsive but weightless, frictionless, and readily readable pointer or rider for the slide S. Moreover the said slide S need not be given any peculiar curvature but may assume the configuration of a regular curve; as the arc of a circle, or a straight line.

If the slide S is a straight edged one, the contour of the member E, in order to have the above mentioned characteristics, may be represented parametrically by the following equations:

$$x = r \cdot \cos \theta - \frac{K \cdot \log \theta - r \cdot \cos(\theta - \alpha) - a}{1 + f(\theta)}$$

$$y = r \cdot \sin \theta + \frac{b - r \cdot \sin(\theta + \alpha)}{1 + f(\theta)}$$

where $$f(\theta) = \frac{K[b - r \cdot \sin(\theta - \alpha)]}{r \cdot \theta [K \log(\theta + \alpha) \cos(\theta + \alpha) + b \cdot \sin(\theta + \alpha) - a]}$$

and where $r$ is the radius OL; $\theta$ is the angular deflection of the arm H; $\alpha$ is the angle of the initial position of the arm H with the X-axis; $a$ is the distance of the marker R from the Y-axis; $b$ is the distance of the scale S from the X-axis; and K is an arbitrary constant on which the relative proportions of the parts depend; the origin being at the pivot O.

This curve is the envelope of the variable ray from light L to the scale S and can be readily obtainable by any skilled mathematician. This curve possesses a characteristic which is of great value in the combination. It has a cusp C, the cuspidal tangent $t$ being the ray tangent to the circle which is the locus of L. In the vicinity of the cusp C the rays which illuminate the slide S assume the shape of a pencil of rays with C as a vertex. Therefore, by selecting the constants $\alpha$, K, $r$, $a$ and $b$ in proper proportions, the rays passing in the vicinity of the cusp may be made to play the principal role, thus making the line of separation of shadow and light on the slide S very sharp.

Various forms of weighing scales may be employed to actuate the arm H, the only condition imposed by the particular physical embodiment above described being that the arm H should be so actuated that its angular deflection is proportional to the weight of the commodity placed upon or in the goods-receiver of the scales. One form of scales which fulfills this condition is illustrated in the drawings and may be constructed substantially as follows:

A main lever 10 of the third class, fulcrumed at 11, supports the platform or goods-receiver 12 on a knife edge pivot 13. The platform is counterpoised by a weight 14 on one end of the lever, while the other end of the latter is connected by a link 15, in the form of a flexible tape, to the cam arm 6 of a pendulum 16 which is mounted on a knife edge pivot O. This pendulum constitutes a load counterbalance, as will be readily understood. A suitable housing 18 encloses the parts above described and also a dash-pot 19.

The pendulum 16 is provided at its top with a carrier 24 in the form of a yoke extending over one end of the pivot to the outside of the housing 18, to which carrier the arm H is secured. The design of the cam 6 is such that the angular deflection of the arm H is directly proportional to the weight of the commodity placed upon the goods-receiver 12.

While I am aware that a properly calibrated weight-indicating scale might be secured to the yoke G adjacent to the slide K, I prefer to utilize the scale D shown in the drawing. This scale is simply one in the shape of the arc of a circle centered at O and secured to the yoke G, in turn secured to the housing 18. As the angular deflection of the arm H is directly proportional to the weight of the commodity it may be provided with a reference line R' adapted to be read on the scale D which is evenly calibrated to give the weight in pounds or other units.

The operation of the device as thus far disclosed may be summarized as follows: The slide S is set manually so that the calibration under the index R inidcates the price per unit weight of the commodity. The commodity having been placed on the goods-receiver 12, a direct reading of total price is obtainable on the slide S by noting where the line of separation of light and shadow crosses the lower edge of said scale. The weight of the commodity may be read on scale D.

As has been previously pointed out the line of separation between the light and shaded portions of the scale S may be made very distinct. The contrast between these light and shaded portions may be made more marked by excluding some of the extraneous light. This may be accomplished by providing a hood 20.

My invention is of course susceptible to modification without departing from the spirit thereof. Thus, if a long wide range slide S is desired and it is undesirable to allow the ends thereof to project a considerable distance beyond the yoke G, the arrangement shown in Fig. 5 may be adopted.

In this figure the slide S' is made in the form of a tape adapted to be wound upon either of two spools 21 from the other. These spools are shown rotatably mounted on the yoke G and some suitable expedient, such as imposing a frictional opposition to rotation of said spools, is provided to prevent undue slackness of the tape. Each of said spools may be provided with a manually operable knob 23 whereby the slide or tape S' may be set with reference to the index R.

It will be appreciated that the slide S, or S', may be calibrated on both its front and back surfaces so that the price reading will be visible to both the vendor and the purchasers. A hood 20 is therefore provided on both sides of said yoke G.

What I claim is:—

1. A computing scale comprising in combination, a logarithmic calculating device settable to the price per unit weight of a commodity, a source of light, and means comprising a weight-actuated part adapted to assume different positions corresponding to different loads for causing said source of light to disclose distinctively that portion of said device which indicates the total price of the commodity.

2. A price computing mechanism comprising in combination, a slide rule manually settable in accordance with the price per unit weight of a commodity, and means comprising a part actuated by the weight of the commodity and whose displacement is in accordance with a function of said weight for distinctively illuminating that portion of the slide rule which indicates the product of the weight and the price per unit weight.

3. The combination with a weighing machine of a source of light, a scale calibrated to antilogarithms, and means comprising a part interposed between said source and scale to cause the former to disclose distinctively a portion of said scale which is spaced from a predetermined reference point a distance proportional to the logarithm of the weight of a commodity.

4. In a computing scale multiplying factors representing the weight of the goods and price per unit-weight, the combination with a support adapted to receive the goods and adapted to be moved thereby; and a calculating device comprising parts relatively and manually adjustable and at least one of which bears a logarithmic scale; of means comprising a part displaced by said support in accordance with the weight of the goods for illuminating a predetermined part of said scale.

5. A computing scale comprising in combination a logarithmic chart, weight-actuated means comprising a part adapted to assume different positions corresponding to different loads for projecting a beam of light upon said chart, and means interposed between said chart and first-named means for controlling said beam.

6. A computing scale comprising in combination, a load support, a device controlled by said load support and displaced thereby in accordance with a function of the weight of a commodity placed upon said load support, a logarithmic calculating device manually settable in accordance with a function of a unit weight of a commodity, and means controlled by said device for distinctively illuminating that portion of said calculating device which indicates the product of the weight and the function per unit weight for which said device has been set.

7. In combination, a straight manually settable logarithmic scale, a load support, and means comprising a part actuated by said load support and displaced thereby in accordance with a function of the weight of a commodity placed upon said load support for distinctively disclosing predetermined portions of said scale in accordance with a function of the weight of a commodity upon the load support.

8. A computing scale comprising in combination, a logarithmic chart, weight-actuated means comprising a part adapted to assume different positions corresponding to different loads for projecting light upon said chart, and means interposed between said chart and first named means for intercepting a portion of light so as to cause a corresponding portion of the chart to lie in shadow.

9. A computing machine as set forth in claim 1 in which the weight actuated part is provided with means for indicating the weight of the commodity.

10. A computing scale comprising in combination, a load support, a device controlled by said load support and displaced thereby in accordance with the weight of a commodity placed upon said load support, a calculating device manually settable in accordance with a function of a unit weight of a commodity, and means controlled by said first named device for distinctively illuminating and pointing out that portion of said calculating device which indicates the product of the weight and the function per unit weight for which said device has been set.

11. A machine as set forth in claim 10 and provided with means controlled by said load support for indicating the weight of the commodity.

12. A machine as set forth in claim 10 in which the function per unit weight is price per pound of the commodity.

13. A computing machine as set forth in claim 2 in which the weight actuated part is provided with means for indicating the weight of the commodity.

14. A machine as set forth in claim 11 in which the function per unit weight is price per pound of the commodity.

15. In a weighing machine, in combination, a logarithmic chart, and weight-controlled means for casting a shadow on said chart to designate different indicia thereof.

In testimony whereof I hereunto affix my signature.

TOBIAS DANTZIG.